United States Patent [19]
Takada

[11] 3,858,617
[45] Jan. 7, 1975

[54] FIBER REINFORCED POLYMERIC RESIN TUBE STRUCTURE

[75] Inventor: Takezo Takada, Hikone, Japan

[73] Assignee: Takata Kojyo Co., Ltd., Tokyo, Japan

[22] Filed: Mar. 30, 1972

[21] Appl. No.: 239,821

Related U.S. Application Data

[63] Continuation of Ser. No. 26,277, April 7, 1970, abandoned.

[52] U.S. Cl. .............................. 138/141, 138/151
[51] Int. Cl. .............................................. F16l 9/12
[58] Field of Search .......... 138/137, 141, 144, 153, 138/DIG. 2, 128, 151

[56] References Cited
UNITED STATES PATENTS

| | | | |
|---|---|---|---|
| 2,360,830 | 10/1944 | Denman | 138/141 |
| 2,653,887 | 9/1953 | Slayter | 138/DIG. 2 |
| 2,703,109 | 3/1955 | Saville | 138/DIG. 2 |
| 2,748,805 | 6/1956 | Winstead | 138/144 |
| 2,854,031 | 9/1958 | Donaldson | 138/141 |
| 3,080,893 | 3/1963 | Craycraft | 138/141 |
| 3,323,962 | 6/1967 | Sprengling et al. | 138/141 X |
| 3,438,401 | 4/1969 | Hannes | 138/141 |

Primary Examiner—Herbert Goldstein
Attorney, Agent, or Firm—Wolder & Gross

[57] ABSTRACT

The opposite outer layers of the web are of synthetic organic polymeric resin of different properties.

8 Claims, 9 Drawing Figures

PATENTED JAN 7 1975
3,858,617
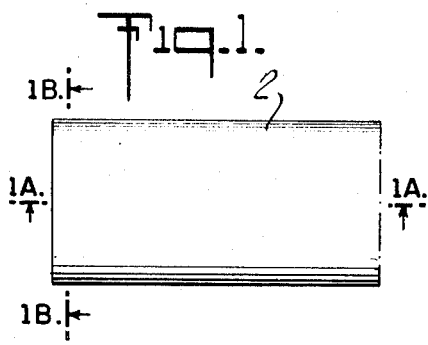
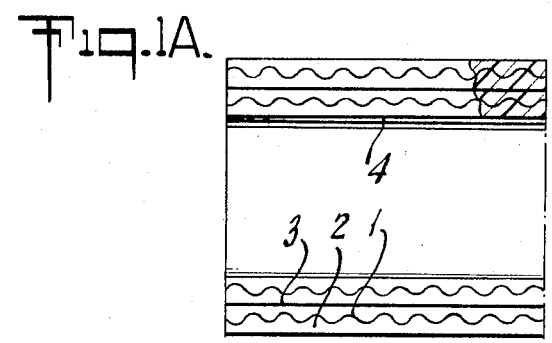
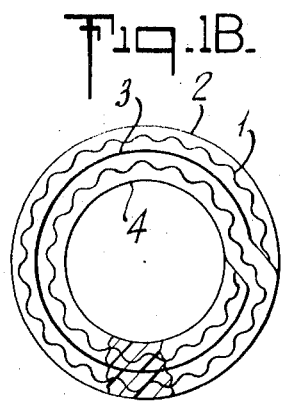
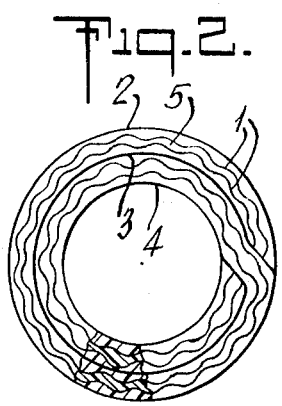
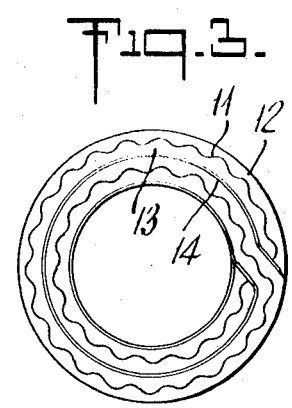
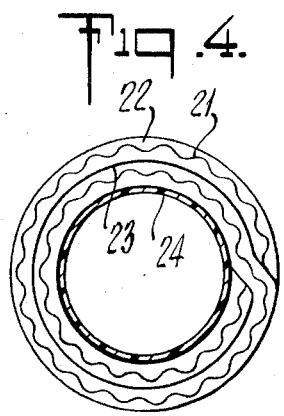
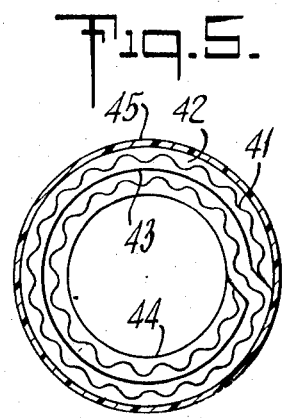
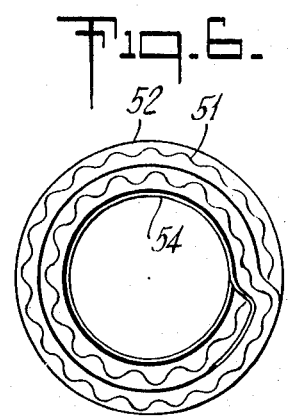
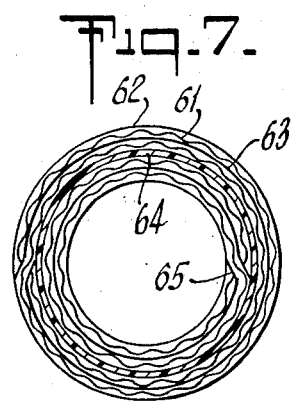
INVENTOR
BY TAKEZO TAKADA
ATTORNEY

FIBER REINFORCED POLYMERIC RESIN TUBE STRUCTURE

This is a continuation of application Ser. No. 26,277 filed Apr. 7, 1970, now abandoned.

BACKGROUND OF THE INVENTION

The present invention relates generally to improvements in tubular structures and it relates particularly to improved conduits, pipes, ducts, hoses and the like for the transmission of fluids and other uses.

Tubular structures such as ducts and hoses have been produced from synthetic organic polymeric resins but these structures which have been heretofore available and proposed and their methods of production possess numerous drawbacks and disadvantages. Among the conventional procedures employed in producing organic plastic tubes are the extrusion of the molten thermoplastic resin in tubular form, the impregnation of a tubular woven or knitted fabric with a fluid settable resin layer, and other procedures. These conventional methods require the use of complex and expensive equipment and different forms and dies of a costly nature for conduits of different sizes, they are highly time and labor consuming and require a high degree of skill and are practically applicable only to tubular structures of small diameters, that is less than one meter in diameter. The resulting tubular structures are thus very expensive in large sizes, are of little adaptability and versatility, and otherwise leave much to be desired.

SUMMARY OF THE INVENTION

It is a principal object of the present invention to provide an improved tubular structure.

Another object of the present invention is to provide a high strength tubular structure which is formed of fiber reinforced synthetic organic resins and which may be produced in large diameters.

Still another object of the present invention is to provide a fiber reinforced resin tubular structure which may be produced with simple and inexpensive equipment in a large range of sizes.

A further object of the present invention is to provide a tubular structure of the above nature characterized by its high strength, wide range of available properties, high versatility and adaptability and low cost.

The above and other objects of the present invention will become apparent from a reading of the following description taken in conjunction with the accompanying drawings which illustrate preferred embodiments thereof.

In a sense the present invention contemplates the provision of a multiple ply tubular structure comprising a web of synthetic organic polymeric resin having reinforcing fibers embedded therein and cylindrically wound into successive overlapping convolutions of successively larger diameter about a longitudinal axis and delineating a longitudinal bore, the confronting faces of successive convolutions of said web being bonded to each other. What is meant by the web being convoluted or cylindrically wound is that it lies in a plane generated by a straight line generatrix traversing a path parallel to itself and the longitudinal axis of the tubular structure and possessing substantially no pitch or lead. The path may be circular with successive convolutions of successively greater diameter or approximately spiral and advantageously the web is wound into two or more overlapping contiguous convolutions.

The reinforcing fibers preferably have a large fraction thereof with circumferentially oriented components and are advantageously in the form of one or more layers of woven or knitted fabrics or non-woven webs for example fleeces, laps, batts and the like. The fibers may be staple fibers or continuous filaments and may be natural, artificial or synthetic. Examples of synthetic fibers are those formed of nylon, polyesters, polyolefines, polyacrylonitriles, polyvinyl alcohol and the like, the natural fibers include cotton, hemp, jute, ramie, sisal, wool, asbestos and the like, and the artificial fibers may be organic or inorganic such regenerated cellulose fibers, glass fibers, metallic fibers and the like.

The synthetic organic polymeric resin forming the body or matrix of the web may be any suitable resin depending on the desired properties, for example flexibility, resiliency, elasticity, shock resistance, resistance to heat, chemicals, oils, and various weathering and other ambient influences. While polyvinyl chloride is employed to great advantage as the web resin matrix, other resins may be employed alone or combined with polyvinyl chloride for example saran, polyolefines and halogenated polyolefins, nylons, synthetic rubbers and the like. Moreover, the web may be formed of a laminate of resins of different properties, the different sides of which possess properties suited for their respective exposures. For example, the face of the laminate forming the inside face of the tube should be resistant to the fluids carried by the tube, for example it may be resistant to oils or organic chemicals or corrosive inorganic chemicals whereas the outer face may be resistant to weathering and other ambient conditions and may possess the greater strength and other physical properties. As an example, the laminated web may have one layer formed of polyvinyl chloride or saran and the other layer formed of nylon. The resin layers may be laminated in any suitable manner, such as by the use of adhesives or cements, plasticizers, solvents or the like, or where possible they may be heat sealed to each other in the known manner. Each of the laminates may contain an embedded fiber layer or the fiber layer may be embedded between the integrated resin layers.

In an alternative construction the convoluted web may be lined with a tube of an oil resistant material which is adhered to the inside face of the wound web and may be formed of nylon resin, synthetic rubber, and the like. Furthermore, the convoluted web tube may be encased in an outer tube of a synthetic resin having a greater heat shrinkability than the web resin and being in a heat contracted state. In addition, the web wound tube may be lined with a metal, preferably a thin flexible metal tube which may have an integral tail which is sandwiched between and cemented to web convolutions adjacent the tube. A cushioned structure which is impact resistant and heat insulated may be provided by sandwiching a soft resilient tube, for example a foamed soft synthetic resin, between a pair of convoluted web tubes of the present structure.

It is clear from the above that the improved tubular structure is of low cost and simple and easy to fabricate in a wide range of sizes with a minimum of equipment. It is strong and highly versatile and adaptable to many uses, and for many environments and ambient conditions.

BRIEF DESCRIPTION OF THE DRAWINGS

FIG. 1 is a front elevational view of a conduit embodying the present invention;

FIG. 1A is a longitudinal sectional view taken along line 1A — 1A in FIG. 1;

FIG. 1B is a transverse sectional view taken along line 1B — 1B in FIG. 1; and

FIGS. 2 to 7 are transverse sectional views similar to FIG. 1B of other embodiments of the present invention.

DESCRIPTION OF THE PREFERRED EMBODIMENTS

Referring now to the drawings, and particularly FIGS. 1 to 1B thereof which illustrate a preferred embodiment of the present invention, the improved tubular structure is formed by a convoluted or cylindrically wound flexible web 2 of a synthetic organic polymeric resin, for example, polyvinyl chloride, having embedded therein a fibrous layer 1, for example, a woven fabric of polyester fiber or other fibers as set forth above. Although the convoluted web tubular structure is illustrated as containing two superimposed convolutions, it may contain more convolutions and the confronting faces of successive convolutions are firmly bonded to each other by layers 3 of adhesive conextensive with the convoluted web confronting faces which adhesive may be of conventional composition, for example, a synthetic resin composition or the like. The bonding of the confronting faces may be effected in other manners, for example, by the use of plasticizers or solvents for the resin, by heat sealing or fusion of the convolution confronting faces or the like. The tubular structure is wound from a rectangular blank of the web 2 about a longitudinal axis parallel to the longitudinal edge of the blank and advantageously on a cylindrical form or mandril. The longitudinal edges 4 of the web are bevelled or tapered, so as to mate the contiguous face of the wound web along the area where the web 2 advances to the next successive convolution and is inclined to the tangent of the tubular structure and the bevelled edges are suitably bonded to the confronting faces of the web to produce corresponding longitudinal lap joints and smooth continuous inner and outer tube faces. The longitudinal edges of web 2 may be otherwise shaped, such as by stepping, to achieve smooth inner and outer tube faces.

After the web 2 has been wound and bonded, as aforesaid, either the inner and outer faces or both may be smoothed by applying heat and pressure thereto, or in any other suitable manner. Furthermore, a plurality of superimposed fibrous layers 1 may be employed and may possess different properties to correspondingly impart the desired properties to the final structure.

In FIG. 2 of the drawings there is illustrated another embodiment of the present invention which differs from that first described in that the web 2 has embedded therein a pair of spaced parallel fibrous layers 1 separated by an intermediate synthetic organic polymeric resin layer 5 and is highly suitable for thick wall tubular structures. The blank web 2, prior to the winding thereof, may be formed by superimposing alternate layers of the polymeric resin and fibrous layers and then bonding them into an integral unitary web by the use of a suitable adhesive, heat and pressure, or the like. As in the first embodiment the rectangular blank web with bevelled longitudinal edges 4 is convoluted and the confronting faces of successive convolutions bonded to each other as earlier described. The fibrous layers 1 may be of the same construction and composition or may be of different constructions and compositions and the resin layers likewise may be of the same or different kinds and composition depending on the desired end product.

A tubular structure having inner and outer faces of different properties and characteristics is illustrated in FIG. 3. Specifically a fibrous cloth layer 11 is sandwiched and embedded between an outer synthetic resin layer 12 formed, for example, of polyvinyl chloride and an inner synthetic resin layer 13 different in composition and properties from outer layer 12, the layers 11, 12 and 13 being bonded into an integral web. The web is cylindrically wound into a convolute tubular structure, as earlier described, with the confronting faces of successive convolutions bonded by a suitable adhesive 14. The layer 12 forms the tube outer face and is selected for its high durability, wear and tear resistance and for its resistance to external ambient conditions whereas the layer 13 forms the inner face of the tube and the corresponding resin is selected for its resistance to the internal conditions such as corrosive chemicals, oils, organic solvents and other materials, heat, abrasion and other influences.

Another structure in accordance with the present invention in which the inside face of the tube possesses different properties from the outside face thereof is shown in FIG. 4 of the drawings. The basic tube structure is formed as in the first embodiment and includes a cylindrically convoluted web 22 of a synthetic polymeric resin, for example, polyvinyl chloride having a fibrous layer 21, for example, of woven cloth, embedded therein, the confronting faces of successive web convolutions being bonded to each other, such as by an adhesive layer 23. Lining the inside of the tubular wound web and suitably bonded thereto is a tube 24 formed of a material which is resistant to the fluids which the tubular structure is designed to handle. For example, tube 24 may be of an oil resistant material such as synthetic rubber, a nylon resin or the like. The tube 24 may be applied to the tubular wound bonded web by coating or soaking or the like or the web forming the convoluted tube structure inside face may be coated or layered with the material forming tube 24 prior to the winding thereof. Alternatively, the web 22 may be wound upon tube 24 and bonded thereto at their interface. The thickness of tube 24 is as desired and depends on the use of the structure.

The tubular structure of the general nature of that shown in FIG. 1 may be advantageously encased in an outer tube which is heat shrunk thereto, as illustrated in FIG. 5 of the drawing. The base tubular structure includes a synthetic polymeric resin web 42 formed, for example, of polyvinyl chloride or copolymers or combinations thereof having a fibrous web 41 embedded therein and cylindrically wound with the confronting faces of successive convolutions bonded as by an adhesive layer 43 and having bevelled longitudinal borders 44 functioning in the manner of borders 4 in the first described embodiment.

The tubular convoluted web is encircled by an outer tube 45 which closely hugs the outer face of the tube wound web and is formed of a synthetic highly polymeric synthetic organic resin having a heat shrinkability greater than that of the resin forming web 42, for example, a polyethylene or other suitable polyolefin resin. The composite structure is produced by telescoping the convoluted web tube into the tube 45 with the latter in its expanded state and then heating the tube 45 to heat shrink and contract the same into tight adherent embrace of the bonded convoluted web tube. The tube 45 may be a woven or knitted fabric, or may be formed of film or the like.

In order to assure a gas impervious structure the tube wound web may have its inner face lined with a thin metal tube formed of metal foil or the like as illustrated in FIG. 6 of the drawing. Specifically, a synthetic polymeric resin web 52 having an embedded fibrous web 51 is cylindrically wound, and bonded at its convolution confronting faces by an adhesive layer 53 as in the earlier embodiments. A metal foil sheet is wound into a tube 54 of one or more superimposed bonded layers and is suitable bonded to the inside face of the tube wound web. The metal foil tube is provided along its length with an outwardly extending tail section which is sandwiched between and bonded to the confronting faces of the innermost overlapping convolutions of web 52. The structure shown in FIG. 6 may be advantageously produced by bonding a longitudinal border of rectangular metal foil blank longitudinally extensive with web 52 to the inner border of web 42 on the face containing the bevelled section thereof. Thereafter, the metal foil and the attached web 52 are spirally wound into successive overlapping convolutions with the metal foil innermost and the confronting faces of successive convolutions suitably bonded to each other.

In FIG. 7 of the drawings there is illustrated another embodiment of the present invention possessing heat insulating, cushioning and impact resistant properties. The tube structure includes inner and outer convoluted web tubes of the construction of the embodiment shown in FIGS. 1 to 1B, each convoluted web tube comprising a polymeric resin layer 62, an embedded fibrous layer 61, a bonding adhesive layer 63 and bevelled borders 65 corresponding to components 2, 1, 3 and 4 respectively of the first described embodiment, the outer tube having a greater inside diameter than the outside diameter of the inside tube. Sandwiched between the convoluted web tubes is a heat insulating and cushioning layer 64 of a preferably soft, expanded synthetic organic resin or foam such as a polyurethane foam, a polyvinyl chloride foam or the like. The structure shown in FIG. 7 may be fabricated in any suitable manner. For example, a sheet of the resin foam may be wound into one or more bonded layers and bonded to the outer face of the inner tube and the outer convoluted web tube may be wound and bonded to the resin foam layer. The composite tubular structure is highly cushioned and resistant to shock and impact and possesses a high degree of heat insulation.

While there have been described and illustrated preferred embodiments of the present invention, it is apparent that numerous alterations, omissions and additions may be made without departing from the spirit thereof. For example, each of the specifically described and illustrated structures may be modified in the manners earlier described, such as by varying the compositions and structures of the fibrous layers and resinous webs and their relationships.

I claim:

1. A multiple ply tubular structure comprising a single integral web including opposite outer layers of synthetic organic polymeric resins of different properties and having reinforcing fibers embedded therein and spirally cylindrically wound into a plurality of successive overlapping contiguous convolutions of successively larger diameter about a longitudinal axis and delineating a longitudinal bore, the confronting faces of successive convolutions of said web being bonded to each other, one of said outer layers forming the inside face of said tubular structure and the other of said outer layers forming the outside face of said tubular structure.

2. The tubular structure of claim 1 wherein at least a part of said fibers have circumferentially oriented components.

3. The tubular structure of claim 1 wherein said fibers are selected from the class consisting of natural fibers, synthetic organic polymeric fibers, inorganic artificial fibers, organic artificial fibers.

4. The tubular structure of claim 1 wherein said resins are selected from the class consisting of polyvinyl chloride, saran, polyolefins, nylons.

5. The tubular structure of claim 1 wherein said reinforcing fibers comprise a web selected from the class consisting of non-woven fibrous webs, woven webs, knitted webs.

6. The tubular structure of claim 1 wherein said web confronting faces are cemented to each other.

7. The tubular structure of claim 1 wherein one of said web layers comprises polyvinyl chloride and said reinforcing fibers comprise a woven fabric of synthetic fibers.

8. The tubular structure of claim 1 wherein said web comprises superimposed layers of different synthetic organic polymeric resins and said reinforcing fibers are disposed at the interface of and are imbedded in both of said layers.

* * * * *